US012615255B2

(12) United States Patent (10) Patent No.: US 12,615,255 B2
Bode (45) Date of Patent: Apr. 28, 2026

(54) METHOD AND AUTOMATION SYSTEM FOR AN AUTOMATION DEVICE

(71) Applicant: Siemens Aktiengesellschaft, Munich (DE)

(72) Inventor: Sebastian Bode, Ahlen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 111 days.

(21) Appl. No.: 18/579,161

(22) PCT Filed: Jun. 8, 2022

(86) PCT No.: PCT/EP2022/065573
§ 371 (c)(1),
(2) Date: Jan. 12, 2024

(87) PCT Pub. No.: WO2023/285039
PCT Pub. Date: Jan. 19, 2023

(65) Prior Publication Data
US 2024/0340282 A1 Oct. 10, 2024

(30) Foreign Application Priority Data
Jul. 13, 2021 (EP) ..................................... 21185262

(51) Int. Cl.
*H04L 9/40* (2022.01)
(52) U.S. Cl.
CPC ................................ *H04L 63/0876* (2013.01)
(58) Field of Classification Search
CPC . H04L 63/0876; H04L 63/0807; H04L 63/08; H04L 63/23; H04L 63/0853
See application file for complete search history.

(56) References Cited

U.S. PATENT DOCUMENTS

| | | | |
|---|---|---|---|
| 2010/0313259 A1* | 12/2010 | Fries .................. | G05B 23/0216 726/10 |
| 2017/0026385 A1* | 1/2017 | Zarkesh .................. | H04W 4/80 |
| 2018/0332033 A1* | 11/2018 | Lakhani .................. | G06F 21/35 |
| 2020/0059881 A1* | 2/2020 | Gupta .................. | H04W 12/009 |
| 2021/0289001 A1* | 9/2021 | Wilson .................. | H04L 63/101 |

OTHER PUBLICATIONS

Search Report for International Application No. PCT/EP2022/065573, 11 pages, Sep. 28, 2022.
Search Report for EP Application No. 21185262.9, 8 pages, Jan. 5, 2022.

* cited by examiner

*Primary Examiner* — Khoi V Le
(74) *Attorney, Agent, or Firm* — Slayden Grubert Beard PLLC

(57) ABSTRACT

Various teachings of the present disclosure include a method for incorporating an automation device into an automation system by using an authentication device. An example method includes: establishing an interface between the automation device and the authentication device and generating an access credential associated with the automation device; receiving and authenticating the access credential on an automation server of the automation system and assigning an access authorization to the automation device; and receiving and authenticating a proof of identity of the access-authorized automation device on the automation server and incorporating the automation device whose identity has been authenticated into the automation system.

9 Claims, 1 Drawing Sheet

METHOD AND AUTOMATION SYSTEM FOR AN AUTOMATION DEVICE

CROSS-REFERENCE TO RELATED APPLICATIONS

This application is a U.S. National Stage Application of International Application No. PCT/EP2022/065573 filed Jun. 8, 2022, which designates the United States of America, and claims priority to EP application Ser. No. 21/185,262.9 filed Jul. 13, 2021, the contents of which are hereby incorporated by reference in their entirety.

TECHNICAL FIELD

The present disclosure relates to automation. Various embodiments of the teachings herein include methods and/or systems for incorporating an automation device into an automation system.

BACKGROUND

As the prevalence of distributed, so-called cloud-based architectures in industrial manufacturing environments increases, technologies that were previously the reserve of server-based data processing are also finding their way into industrial automation devices—that is to say into intelligent field devices, sensors, actuators and control units of automation engineering and also into automation installations. It is also possible to see a relocation of computing resources that places greater emphasis on computing operations "in the field", that is to say on an industrial field level. This relocation is also referred to in specialist circles as edge computing.

In the course of this relocation of computing resources, tasks that were previously the reserve of higher control levels increasingly need to be handled on a level associated with the automation devices. The increasing number of networked automation devices such as these and the special conditions on the industrial field level mean that the approaches to a solution that are known from the control level are not necessarily transferable to the field level.

Newly added, repaired or reconfigured automation devices or automation devices whose software has been refreshed normally need to be configured before they can be used in the automation system or in combination with other automation devices. Adaptation of the automation device, e.g. by configuring the configuration data stored on the automation device, for incorporation into the automation system is also referred to in specialist circles as onboarding.

In contemporary automation systems, it is known practice to adapt an automation device for operation in a specific automation system by also parameterizing the automation device before it is actually used. This parameterization may include general configuration data, for example a network address permanently allocated to the automation device within the automation system or use-specific configuration data, for example switching times of the automation device.

While such parameterization is provided without protection in conventional automation systems, protection against manipulation right down to the field level is now regarded as indispensable. The aim here is to ensure that third parties have no way of manipulating configuration data on the automation device, even if they gain access to the automation system. Automation devices today are therefore normally equipped with credentials when delivered.

By way of example, the credentials used are pre-shared keys or PSKs or pre-shared secrets, which are stored on the automation device. Identification features of the automation device, e.g. a serial number, are also often used as a credential or as part of a credential for incorporating the automation device into the automation system.

Furthermore, stronger asymmetric cryptographic credentials are known in which a cryptographic storage module or trusted platform module, TPM for short, that is to say a hardware module, usually installed in isolation in the automation device, for computing and/or holding cryptographic data, is used. Such a storage module may already store a cryptographic key or a cryptographic key pair in the delivered state of the automation device, private cryptographic keys remaining stored inside the automation device and not leaving it.

SUMMARY

The present disclosure engages the problem of incorporating an automation device into an automation system that allow pre-installed credentials to be dispensed with while security remains the same. For example, some embodiments of the teachings herein include a method for incorporating an automation device into an automation system by using an authentication device that can be connected to the automation device, comprising: establishing an interface (IF) between the automation device (DVC) and the authentication device (AUT) and generating an access credential (ACC) associated with the automation device (DVC); receiving and authenticating the access credential (ACC) on an automation server (SRV) of the automation system and assigning an access authorization to the automation device (DVC); and receiving and authenticating a proof of identity (IDC) of the access-authorized automation device (DVC) on the automation server (SRV) and incorporating the automation device (DVC) whose identity has been authenticated into the automation system.

In some embodiments, the interface (IF) is formed by an immediate optical or electrical direct connection.

In some embodiments, the access credential (ACC) is sent from the automation device (DVC) to the automation server (SRV).

In some embodiments, the access credential (ACC) is sent from the authentication device (AUT) to the automation server (SRV).

In some embodiments, the access credential (ACC) is generated by collaboration between the automation device (DVC) and the authentication device (AUT).

In some embodiments, the access credential (ACC) is generated by carrying out a challenge-response method.

In some embodiments, the proof of identity (IDC) is received by way of a communication channel established between the authentication device (AUT) and the automation server (SRV).

In some embodiments, the authentication device (AUT) initiates this method.

As another example, some embodiments include an automation system for incorporating an automation device into an automation system by using an authentication device that can be connected to the automation device, the automation system comprising: an interface (IF) between the automation device (DVC) and the authentication device (AUT) for generating an access credential (ACC) associated with the automation device (DVC); an automation server (SRV) designed to receive and authenticate the access credential (ACC) and to assign an access authorization to the automation device (DVC); and the automation server (SRV) furthermore being designed to receive and authenticate a proof of identity (IDC) of the access-authorized automation device (DVC) and to incorporate the automation device (DVC) whose identity has been authenticated into the automation system.

In some embodiments, the authentication device is at least partly in the form of a mobile communication terminal.

In some embodiments, the authentication device is at least partly in the form of a network device, in particular in the form of a router or in the form of a network switch.

In some embodiments, the authentication device comprises multiple components communicatively coupled to one another.

BRIEF DESCRIPTION OF THE DRAWINGS

Further exemplary embodiments and advantages of the teachings herein are explained in more detail below with reference to the drawings, in which.

DETAILED DESCRIPTION

Figure 1:
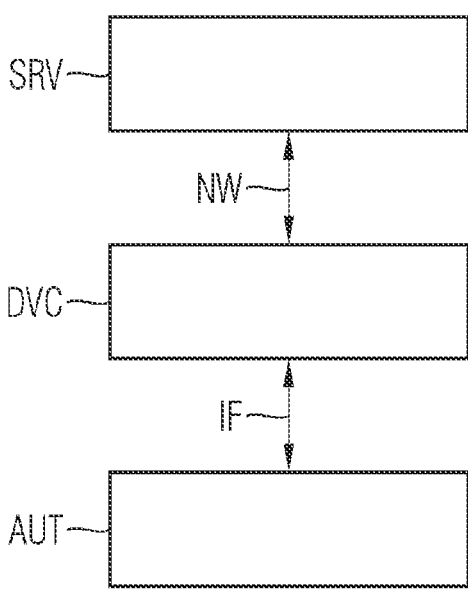
FIG. 1: shows a schematic functional illustration of communication links for incorporating an automation device into an automation system incorporating teachings of the present disclosure.

As an example, some embodiments of the teachings herein include a computer-implemented method for incorporating an automation device into an automation system by using an authentication device that can be connected to the automation device has provision for the following:

establishing an interface between the automation device and the authentication device. The interface may be in the form of a logical communication channel or "session". In a preferred variant, this interface is a direct interface, and so for security reasons there may be a need for a direct connection between the automation device and the authentication device. After this interface has been established between the automation device and the authentication device, an access credential associated with the automation device is generated. By way of example, the access credential is generated by collaboration between the automation device and the authentication device connected to the automation device via the interface. Alternatively, the access credential may also be generated largely by the automation device alone, with e.g. data transmitted or interchanged by the authentication device via the interface being used for the generation. Accordingly, the access credential may also be generated largely by the authentication device alone, with e.g. data transmitted or interchanged by the automation device via the interface being used by the authentication device for the generation.

receiving and authenticating the access credential on an automation server of the automation system and assigning an access authorization to the automation device. The credential received by the automation server may be sent either by the automation device or by the authentication device, in this regard see the exemplary embodiments explained later on. Accordingly, the credential received by the automation server may be sent by the automation device or the authentication device indirectly, i.e. forwarded via one or more instances before being received the server. Following successful by automation authentication of the access credential by the automation server and following assignment of the access authorization to the automation device, the automation device has access authorization on the automation server or the automation system. The access authorization is not comprehensive, however, but rather relates only to reception of the proof of identity in the next method step. In other words, the access authorization is an intermediate stage in which the automation device has not yet been incorporated in the automation system.

receiving and authenticating a proof of identity of the access-authorized automation device—that is to say the automation device to which an access authorization has been assigned-on the automation server and incorporating the automation device whose identity has been authenticated into the automation system. The authentication of the identity of the automation device completes the incorporation of the automation device in the automation system in terms of authorization. Naturally, the incorporation of the automation device may also comprise a parameterization, for example a transmission and adjustment of configuration data on the automation device. This parameterization is ensured using the authorization-related methods and/or systems described herein, but is neither a necessary prerequisite nor a necessary accompaniment for the methods or the systems incorporating teachings of the present disclosure.

In some embodiments, an interface between the automation device to be connected and an authentication device uses data interchanged via this interface to allow the automation device to be associated with the authentication device to start with. The presence of the authentication device thus already has the effect of a first credential in the form of a multifactor authentication.

If necessary, the authentication device may be plugged in and unplugged or connected and disconnected by a service engineer authorized to do so, in order to activate or deactivate this first factor of the multifactor authentication. Depending on security criticality, it may be a stipulation for the interface to meet certain more stringent requirements—for example to be present as an immediate direct connection in order to additionally require the service engineer to be locally present in the immediate surroundings of the automation device that is to be incorporated.

After the devices have been connected, a first authentication method is carried out. In this step, an automation server of the automation system receives a proof, verified by the authentication device, of a specific automation device having been connected to the authentication device. The automation server can take this then as a basis for assigning characteristics to the automation device, for example organizing an access authorization or, even at this stage—that is to say before the automation device has been finally incorporated—causing the automation device to be parameterized.

After the access authorization is available, a second authentication method is carried out. This second authentication method then actually authenticates a proof of identity of the access-authorized automation device, by using a proof of identity connected to the automation device. "Connected" may also mean that the proof of identity is available in the automation device, but the proof of identity does not necessarily leave the automation device, for example by being transferred to the automation server.

By way of example, the proof of identity may be provided by way of a challenge-response method, in which the automation server sets a challenge for which the automation device needs to provide a correct response, for example in order to prove that it knows a certain piece of information-a shared secret-without issuing or transmitting the proof of identity itself. In this broad sense, the proof of identity is connected to the automation device. That is to say that the proof of identity is in particular not—as is possible in the first authentication method—connected to the authentication device. The authentication of the identity of the automation device by the automation system completes the incorporation of the automation device in the automation system in terms of authorization.

An important difference between the invention and known—including multilevel-authentication methods is the circumstance that solutions known from the prior art always combine an identity with a proof—that is to say a credential such as e.g. a cryptographic key.

In contrast to these solutions, the teachings of the present disclosure include combining an authorization—not an identity—with a proof—the access credential. Not until in a subsequent second authentication method is an identity combined with a proof—the proof of identity.

Providing a first authentication method for authenticating an access credential, followed by a second authentication method for authenticating a proof of identity, may provide several advantages:

While known methods involve using cryptographic keys connected to an access medium—for example a USB stick with a cryptographic storage module or TPM—possession of the access medium alone is sufficient to grant an access authorization, the access authorization according to the invention, by contrast, does not in itself permit access for the purposes of incorporation. Rather, the access authorization described herein only permits access with the aim of combining an identity with an authorization, so the proof of identity.

A distinction is furthermore drawn between the individual devices both when carrying out the methods described herein for incorporating the automation device in the automation system by using the authentication device that can be connected to the automation device and after this method has been performed. A later decision about authorizations is thus taken primarily on the basis of the proof of identity rather than on the basis of the access credential with the assistance of the formerly connected authentication device.

A particular advantage of the separate proofs described herein—access credential and proof of identity—becomes clear when the provision or "deployment" of a plurality of automation devices incorporated by way of a single authentication device is considered. The respective access credential generated with the assistance of the single authentication device has indeed issued a comparable preliminary access authorization to each individual instance of the plurality of automation devices. Following incorporation of the respective automation devices, the respective access rights thereof—that is to say their rights to store data in a specific memory area of the automation server or to read data therefrom—are dependent solely on the rights allocated to their identity, which identity, in contrast to the comparable preliminary access authorization, will be quite different from automation device to automation device.

By way of example, the access credential and/or proof of identity incorporating teachings of the present disclosure may be arranged or used by applying known public key infrastructure or PKI, that is to say for example by using asymmetric or symmetric cryptographic keys and corresponding methods related to signing, certificate use, hierarchic trust models, etc.

In some embodiments, the interface between the automation device and the authentication device may be formed by an immediate optical or electrical direct connection. While this interface may also be in the form of a logical communication channel or "session" in a data network, possibly within the worldwide Internet, the interface in this development of the invention is a direct interface, and so for security reasons there may be a need for an immediate direct connection between the automation device and the authentication device. Depending on security criticality, this measure may be necessary in order to meet more stringent requirements in respect of the local presence of an authorized service engineer in the immediate surroundings of the automation device that is to be incorporated. An immediate connection is formed by way of an optical or electrical patch cable, for example. In some embodiments, the interface may be formed using reserved, including proprietary, phasic female or male connectors. There is also the possibility of a direct connection involving passive components for making the connection, e.g. sockets, patch panels, etc. By contrast, an indirect connection is characterized by at least one active unit being interposed in the optical or electrical connection, for example a switch, a router, a repeater, a signal amplifier or signal shaper, an optical signal component, etc.

In some embodiments, a check for an immediate direct connection may be performed in order to preclude an indirect connection. A check on or verification of an immediate connection and/or preclusion or falsification of an indirect connection means in particular that it is possible to preclude the automation device with the connected authentication device from being collectively connected to a "transparent" network node, that is to say for example to a network switch. This is because possible attackers could interpose active transparent units in a physical connection between the automation device and the connected authentication device. Transparent in this context means that these units would not be detected by monitoring methods or intrusion detection methods that are in place. Such transparent units are connected in line by way of a conventional LAN connection, but cannot be identified or detected by monitoring systems in higher layers, since their effect in higher layers may be compared with that of a passive patch cable.

In some embodiments, the access credential may be sent from the automation device to the automation server. This may take place in two ways:

In some embodiments, the access credential may be sent from the automation device to the automation server, the authentication device communicating exclusively with the automation device in this first variant embodiment.

In some embodiments, the access credential may be sent from the authentication device to the automation server. In this second variant, the access credential may be sent from the automation device to the automation server indirectly in accordance with the development explained here, that is to say, to be more precise, from the automation device to the authentication device and from the latter to the automation server.

In some embodiments, the access credential may be sent from the authentication device to the automation server. In this development, there is thus provision for the access credential to be sent from the authentication device to the automation server directly, the automation device communicating exclusively with the authentication device.

In some embodiments, the access credential may be generated by collaboration between the automation device and the authentication device. Such a collaboration between the automation device and the authentication device can be distinguished from a pure request for a certificate or a signature provided with a private signing key and has the advantage that a transmission of sensitive proofs—for example keys that need to remain private—and an associated compromise with regard to possible man-in-the-middle attacks can be avoided. Generation of the access credential by carrying out a challenge-response method is one possible embodiment of such a collaboration between the automation device and the authentication device to generate the access credential.

In some embodiments, the proof of identity may be received by way of a communication channel established between the authentication device and the automation server. This development thus relates to one of the variants explained above in which—albeit there in an explanation for when the access credential is being transmitted—an indirect or direct data interchange takes place via a communication channel established between the authentication device and the automation server. The embodiment explained here relates to reception of the proof of identity transmitted via a communication channel established between the authentication device and the automation server. In this case, the communication channel can be maintained for transmission of the access credential until the proof of identity is transmitted between the authentication device and the automation server.

In other words, the communication channel may be the same. By way of example, this communication channel may be provided via one or more networks or network segments, and so measures to protect against interchanged data being compromised prove advantageous to secure this communication channel via any networks or network segments that are not subject to a check of their own. Such security may involve encrypting the communication channel. In specialist circles, this measure is usually classified—although not entirely technically correct—under the term virtual private network or VPN.

In some embodiments, the authentication device may initiate one or more of the methods described herein, for example by plugging the authentication device into a female connector of the automation device or by plugging a connecting cable leading to the authentication device into the female connector of the automation device. In some embodiments, the methods incorporating teachings of the present disclosure is initiated by operating an input panel displayed or provided on the authentication device.

In some embodiments, the authentication device may be at least partly in the form of a mobile communication terminal. This embodiment may use commercially available hardware adaptable for the respective purpose of use by means of suitable software for incorporating the automation device by using the mobile communication terminal as an authentication device.

In some embodiments, the authentication device may be at least partly in the form of a network device, in particular in the form of a router or in the form of a network switch. A router or network switch can provide a communication channel in or via a reserved IP address space (for example in the case of a router) or a reserved communication channel, for example by (for example in the case of a network switch) using a VLAN (Virtual Local Area Network) protocol. The reserved communication channel can be used both for transmitting the access credential and for transmitting the proof of identity between the authentication device in the form of a network device and the automation server.

In some embodiments, the authentication device may comprise multiple components communicatively coupled to one another. This embodiment may firstly be intended to target redundant fail-safety. Secondly, multiple components communicatively coupled to one another may also produce continued multifactor authentication. In some embodiments, a service engineer may be entrusted with a first component of an authentication device and for an agent with the task of network administration of the automation system to hold a second component of an authentication device.

After the interface between the automation device and the first component of the authentication device has been established, generation of the access credential associated with the automation device is deferred until the agent with the task of network administration of the automation system has become aware of the establishment of the interface between the automation device and the first component of the authentication device and has used his second component of the authentication device to give clearance. Becoming aware may be disposed such that after the interface between the automation device and the first component of the authentication device has been established the service engineer initially needs to send an enquiry to the second component of the authentication device.

FIG. 1 shows a detail from an automation system incorporating teachings of the present disclosure, the administrative portal of which is represented in a simplified manner by an automation server SRV. In real implementations, the automation system may, depending on complexity and size, comprise not only the automation server SRV but also other servers and control components. For this description, the automation server SRV shown serves merely as an example of one or more components that are used for onboarding automation devices.

According to the depiction shown in FIG. 1, an automation device DVC is incorporated into an automation system such that an interface IF is established between the automation device DVC and the authentication device AUT, the automation device DVC having an additional communication channel NW with the automation server SRV. This communication channel NW is normally in the form of a possibly temporary, packet-oriented communication link or "session" via a packet-oriented network.

The statements above relating to the communication channel NW may also apply in principle to the interface IF. So as not to expose the connection of the interface IF to the random nature and risk of a poorly traceable network connection that does not permit immediate inspection of the connected authentication device AUT, however, there may be provision for the interface IF to be formed by an immediate optical or electrical direct connection.

After the interface IF between the automation device DVC to be connected and the authentication device AUT has been established, the authentication device AUT provides data to associate the automation device DVC that is to be connected. An authentication method is then carried out e.g. between the automation device DVC that is to be connected and the authentication device AUT.

The automation server SRV or an alternative superordinate system receives an access credential, which, in its simplest form, contains a statement indicating that a specific automation device DVC has been connected to the authentication device AUT.

As a result of this, the automation device DVC can then assign characteristics to the automation device DVC, for example can set up access rights.

In some embodiments, the automation device DVC could be a controller and the authentication device AUT could be a USB stick. The USB stick in the form of the authentication device AUT contains, inter alia, for example a trusted platform module or TPM, including a private key. The USB stick in the form of the authentication device AUT therefore allows a challenge-response method to be carried out to generate an access credential associated with the automation device. The related challenge-response method can essentially be carried out on the automation device DVC that is to be connected and only to a lesser extent on the USB stick in the form of the authentication device AUT.

Figure 2:
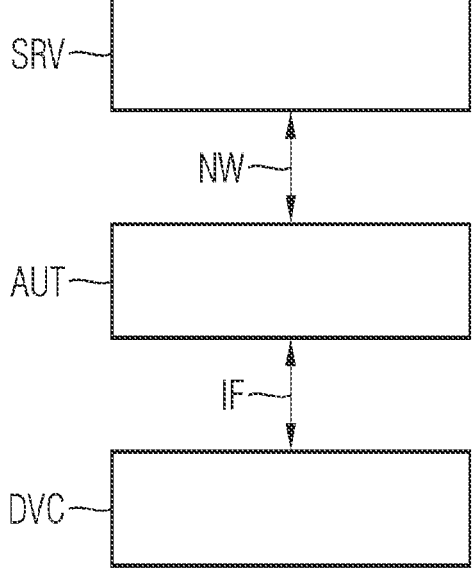
FIG. 2: shows a schematic functional illustration of communication links for incorporating an automation device into an automation system incorporating teachings of the present disclosure.

According to the depiction shown in FIG. 2, an automation device DVC is incorporated into an automation system such that an interface IF is established between the automation device DVC and the authentication device AUT, the authentication device AUT having an additional communication channel NW with the automation server SRV. This communication channel NW may also be in the form of a possibly temporary, packet-oriented communication link or "session" via a packet-oriented network.

In some embodiments, the authentication device AUT could be a USB mobile radio adapter that is able to establish a mobile radio connection by presenting a subscriber identity, the subscriber identity being embodied in a SIM card or stored in the USB mobile radio adapter as a digital eSIM. In this embodiment, the USB mobile radio adapter in the form of the authentication device AUT facilitates access to an additionally secured communication channel established above the mobile radio connection in a VPN network via which the access credential and/or the proof of identity are/is then interchanged with the automation server SRV.

In some embodiments, the authentication device AUT could be a programming device that registers connected devices after they have been identified. In some embodiments, the authentication device AUT could be in the form of a network device, e.g. router, or in the form of a mobile terminal, e.g. smartphone. In some embodiments, the authentication device AUT could itself require authentication of a user or attendant, for example on startup or when the interface IF with the automation device DVC is established. In some embodiments, the automation device DVC is provided with new access data in addition to existing access data after it has been incorporated or "onboarded" into the automation system.

In real implementations, the automation system may, depending on complexity and size, comprise not only the automation server SRV but also other servers and control components. Besides an authentication server—not shown—for actually authenticating the access credential or the proof of identity, there may be provision for a policy enforcement server—not shown. By way of example, this policy enforcement server is used to attach current device-specific operator data as soon as a successful authentication of the automation device to the authentication server is reported to the policy enforcement server. In one possible embodiment, it is also possible for the current device-specific operating data to be attached to the authenticated proof of identity of the automation device by the policy enforcement server. A configuration server—not shown—may be used to transfer current device-specific operator data to the policy enforcement server.

A fundamental difference between the embodiments proposed here and known solutions with a PKI-based (Public Key Infrastructure) registration with services by means of a storage module is that these solutions known from the prior art provide for an identity to be combined with a credential—for example a cryptographic key. By contrast, the solution according to the invention initially involves not an identity but rather an authorization being connected to the credential.

The prior art contains solutions for which there is provision for the access medium containing the storage module and the key to be passed on which attach the key to an identity, specifically that of the access medium. This logic can also be seen in particular in that the association of the authorizations with the access medium is generally dynamic and possession of the access medium alone is sufficient to be granted access.

A measure comparable with the aforementioned access medium does not in itself provide access. Rather, an authentication device according to the invention permits an authorization for access that entails an identity being combined with an authorization only in a subsequent step. In addition, a distinction continues to be drawn between individual automation devices DVC. A later decision about authorizations is thus taken primarily on the basis of the proof of identity rather than on the basis of a formerly connected authentication device AUT.

This becomes particularly clear when a large number of devices receive, via an authentication device, the authorization to store data in a specific memory and to read data of their own. Although the read access, like the write access, is also dependent on having received a use authorization, it is primarily dependent on whether the applicable data have been written by the device itself.

The teachings herein thus facilitate simple configuration of an automation system when security is high, specifically protection against attacks by third parties due to carelessness during configuration. The method may be more useful for manufacturers of automation devices DVC that are sold as universal devices and are only later intended to be incorporated into an automation system by the customer.

What is claimed is:

1. A method for incorporating an automation device into an automation system by using an authentication device, the method comprising:

establishing an interface between the automation device and the authentication device;

generating an access credential associated with the automation device by collaborating the automation device and the authentication device;

receiving and authenticating the access credential on an automation server of the automation system;

assigning an access authorization to the automation device; and receiving a proof of identity through a communication channel established between the authentication device and the automation server;

authenticating the proof of identity of the access-authorized automation device on the automation server; and incorporating the automation device whose identity has been authenticated into the automation system;

wherein the interface comprises an immediate optical or electrical direct connection.

2. The method as claimed in claim 1, further comprising sending the access credential from the automation device to the automation server.

3. The method as claimed in claim 1, further comprising sending the access credential from the authentication device to the automation server.

4. The method as claimed in claim 1, further comprising generating the access credential by carrying out a challenge-response method.

5. The method as claimed in claim 1, wherein the authentication device initiates the method.

6. An automation system for incorporating an automation device into an automation system using an authentication device, the automation system comprising:

an interface including an immediate optical or electrical direct connection between the automation device and the authentication device for generating an access credential associated with the automation device by collaborating the automation device and the authentication device; and an automation server including at least one processor and an associated memory to receive and the access credential from the authentication device, authenticate the access credential, and to assign an access authorization to the automation device if authentic;

wherein the automation server receives a proof of identity of the access-authorized automation device from the authentication device through a communication channel established between the authentication device and the automation server, authenticates the proof of identity of the access-authorized automation device, and incorporates the automation device whose identity has been authenticated into the automation system.

7. The automation system as claimed in claim 6, wherein the authentication device comprises a mobile communication terminal.

8. The automation system as claimed in claim 6, wherein the authentication device comprises a network device.

9. The automation system as claimed in claim 6, wherein the authentication device comprises multiple components communicatively coupled to one another.

* * * * *